United States Patent Office 2,858,338
Patented Oct. 28, 1958

2,858,338
PREPARATION OF UNSATURATED CYANAMIDES

Angelo J. Speziale, Kirkwood, Mo., assignor to Monsanto Chemical Company, St. Louis, Mo., a corporation of Delaware No Drawing. Application December 30, 1954
Serial No. 478,882

14 Claims. (Cl. 260—551)

This invention relates to a novel method for preparing high yields of unsaturated cyanamides. More specifically, the invention relates to methods of preparing unsaturated cyanamides from readily available unsaturated chlorides.

It is well known that alkali metal cyanamides will react with unsaturated halides containing three carbon atoms to prepare cyanamides containing organic radicals corresponding to the particular unsaturated halide used in the reaction in accordance with the following equation:

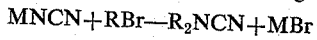

$$MNCN + RBr \rightarrow R_2NCN + MBr$$

wherein M is an alkaline metal and R is the unsaturated radical.

This reaction is not generally industrially feasible in view of the fact that the bromides are costly and because the yields of the unsaturated aliphatic cyanamides are quite low. The purpose of this invention is to provide an industrially feasible method of preparing unsaturated cyanamides by improvement of the yields and by using the available and inexpensive chlorides in place of the costly bromides. A further purpose of this invention is to provide a novel preparation of the unsaturated cyanamides in industrially practicable yields. A further purpose of this invention is to provide a cheap and simple means of preparing allyl type amines free of the monoamines.

In accordance with this invention it has been found that alkaline metal cyanamide will react more efficiently with unsaturated chlorides having three carbon atoms if the invention is catalyzed by the presence of a copper salt. A preferred modification of this invention involves the use of an alkaline earth metal cyanamide, for example calcium cyanamide, in the presence of a strong alkali metal hydroxide. In the latter procedure the alkali metal cyanamide is formed in situ. The resulting cyanamides, which are formed in high yields, may be readily converted to the corresponding amines free of monoamines in a manner well known to the prior art.

In the practice of this invention the reaction is conducted in the presence of a catalytic amount of the copper salt, preferably from 0.1 to 10 percent based on the weight of the unsaturated chloride. Suitable copper salts are:

Cupric chloride
Cuprous chloride
Cuprous nitrate
Cupric nitrate
Cuprous sulfate
Cupric sulfate
Cupric sulfite
Cuprous sulfite
Cupric acetate
Cuprous acetate and other cuprous and cupric salts of other acids, particularly the water-soluble copper salts. Although in general any unsaturated aliphatic chloride having three carbon atoms in a straight chain may be used in the practice of this invention, the use of allyl chloride, 2-chloroallyl chloride, methallyl chloride, 3-chloroallyl chloride and propargyl chloride are preferred. The reactions are preferably conducted by mixing the calcium cyanamide with sodium hydroxide in water solution while maintaining the temperature at or below room temperature. The mixture is stirred until the reaction is complete. Thereafter allyl chloride is gradually added to the reaction mixture, which may be heated to effect a more rapid reaction. While agitating the reaction mixture the mixture was heated at reflux until the reaction was complete and the product was cooled to room temperature and filtered. The product is separated from the filtrate by separation of the solvent layer and extraction of the aqueous layer with additional fresh solvent to insure complete removal of the product.

Further details of the practice of this invention are set forth in the following specific examples.

Example 1

100 g. of calcium cyanamide was suspended in 200 cc. of water. Thereafter a solution of 112 g. of 50 percent sodium hydroxide and 45 cc. of water cooled to 10–15° C. was added over a 15 minute period. The resulting mixture was stirred for one hour while maintaining the temperature below 25° C. The reaction mixture was then charged with 250 cc. of benzene and 1 g. of cuprous chloride. Over a period of 30 minutes 120 g. of allyl chloride was gradually added to the reaction mixture while gently heating. During the period of addition the temperature rose from 20 to 37° C. The mixture is then heated under a reflux condenser for three hours in such a manner that gentle refluxing action took place. The reaction mixture was then cooled at room temperature and filtered. The filter cake was washed with 100 cc. of water and 100 cc. of benzene. The combined aqueous layers were extracted with the benzene wash liquor. The combined benzene solutions were dried with anhydrous magnesium sulfate and the benzene was evaporated at atmospheric pressure. The liquid residue, which was essentially diallylcyanamide, was distilled under reduced pressure and a 78.0 percent yield of product was recovered at 81–84° C. and 3.0 mm. pressure.

Example 2

The method of Example 1 was repeated without the copper salt. A yield of only 54.5 percent of diallylcyanamide was recovered by distillation at reduced pressure.

What is claimed is:

1. A method of preparing unsaturated cyanamide which comprises reacting an alkali metal cyanamide with an aliphatic unsaturated chloride having three carbon atoms in the longest chain in the presence of a catalytic amount of a copper salt.

2. The method defined by claim 1 wherein the unsaturated chloride is allyl chloride.

3. The method defined by claim 1 wherein the unsaturated chloride is methallyl chloride.

4. The method defined by claim 1 wherein the unsaturated chloride is 2-chloroallyl chloride.

5. The method defined by claim 1 wherein the unsaturated chloride is 3-chloroallyl chloride.

6. The method defined by claim 1 wherein the unsaturated chloride is propargyl chloride.

7. The method of preparing unsaturated cyanamide which comprises heating in the presence of an alkali metal hydroxide calcium cyanamide and an aliphatic unsaturated chloride having three carbon atoms in a straight chain in the presence of 0.1 to 10 percent of a copper salt based on the weight of the aliphatic chloride.

8. The method of preparing an unsaturated aliphatic cyanamide which comprises heating calcium cyanamide with the unsaturated aliphatic chloride having three carbon atoms in the longest chain in an aqueous alkaline medium in the presence of 0.1 to 10 percent based on the weight of the unsaturated chloride of a copper salt.

9. The method defined by claim 8 wherein the unsaturated chloride is allyl chloride.

10. The method defined by claim 8 wherein the unsaturated chloride is methallyl chloride.

11. The method defined by claim 8 wherein the unsaturated chloride is 2-chloroallyl chloride.

12. The method defined by claim 8 wherein the unsaturated chloride is 3-chloroallyl chloride.

13. The method defined by claim 8 wherein the unsaturated chloride is propargyl chloride.

14. The method of preparing an unsaturated cyanamide which comprises reacting an alkali metal cyanamide with an aliphatic unsaturated chloride having up to three (3) carbon atoms in the presence of a catalytic amount of a copper salt of the group consisting of cupric chloride, cuprous chloride, cuprous nitrate, cupric nitrate, cuprous sulfate, cupric sulfate, cupric sulfite, cuprous sulfite, cupric acetate, and cuprous acetate.

References Cited in the file of this patent

UNITED STATES PATENTS

| | | |
|---|---|---|
| 1,659,793 | Vliet | Feb. 21, 1928 |

FOREIGN PATENTS

| | | |
|---|---|---|
| 146,289 | Great Britain | Sept. 22, 1921 |
| 104,101 | Switzerland | May 1, 1924 |